US008289901B2

(12) United States Patent
Tosic et al.

(10) Patent No.: US 8,289,901 B2
(45) Date of Patent: Oct. 16, 2012

(54) PINNING AND CASCADING AVOIDANCE IN DYNAMIC CHANNEL ASSIGNMENT FOR WIRELESS LANS

(75) Inventors: Predrag Tosic, Milpitas, CA (US); Sandeep Jay Shetty, San Jose, CA (US); Douglas Chan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 710 days.

(21) Appl. No.: 12/405,429

(22) Filed: Mar. 17, 2009

(65) Prior Publication Data
US 2010/0238871 A1    Sep. 23, 2010

(51) Int. Cl.
H04W 4/00    (2009.01)
H04B 7/26    (2006.01)
H04L 1/20    (2006.01)

(52) U.S. Cl. ........ 370/328; 370/329; 370/335; 370/352; 370/252; 370/279; 342/372; 342/383; 709/231; 455/456.1

(58) Field of Classification Search .......... 370/328–463; 455/456.1; 709/231
See application file for complete search history.

(56) References Cited

U.S. PATENT DOCUMENTS

| | | | | |
|---|---|---|---|---|
| 6,473,036 B2 * | 10/2002 | Proctor, Jr. | | 342/372 |
| 6,933,887 B2 * | 8/2005 | Regnier et al. | | 342/372 |
| 7,019,753 B2 * | 3/2006 | Rappaport et al. | | 345/582 |
| 7,289,574 B2 * | 10/2007 | Parolari | | 375/295 |
| 7,444,145 B2 * | 10/2008 | Diener | | 455/423 |
| 7,667,572 B2 * | 2/2010 | Husak et al. | | 340/10.1 |
| 7,667,575 B2 * | 2/2010 | Husak et al. | | 340/10.2 |
| 7,692,532 B2 * | 4/2010 | Fischer et al. | | 340/10.2 |
| 7,817,014 B2 * | 10/2010 | Krishna et al. | | 340/10.4 |
| 7,849,216 B2 | 12/2010 | Gong et al. | | |
| 7,911,985 B2 * | 3/2011 | Proctor et al. | | 370/279 |
| 7,933,225 B2 * | 4/2011 | Chow et al. | | 370/259 |
| 8,019,352 B2 * | 9/2011 | Rappaport et al. | | 455/456.1 |
| 2003/0222818 A1 * | 12/2003 | Regnier et al. | | 342/383 |
| 2005/0036570 A1 * | 2/2005 | Kwak et al. | | 375/316 |
| 2005/0068231 A1 * | 3/2005 | Regnier et al. | | 342/372 |
| 2005/0073983 A1 * | 4/2005 | Diener | | 370/338 |
| 2005/0254442 A1 * | 11/2005 | Proctor et al. | | 370/294 |

(Continued)

*Primary Examiner* — Ayaz Sheikh
*Assistant Examiner* — Venkatesh Haliyur
(74) *Attorney, Agent, or Firm* — Edell, Shapiro & Finnan, LLC

(57) ABSTRACT

Techniques are provided to determine channel assignments for wireless access point (AP) devices in a wireless local area network (WLAN). From each of a plurality of AP devices operating at least one of a plurality of channels in the WLAN, wireless activity data is received that represents activity in each channel associated with signals of devices operating in the WLAN and associated with signals and energy from devices that are not operating in the WLAN as detected by the AP devices by receiving radio frequency energy in each of the plurality of channels. During a channel plan evaluation session, the wireless activity data is evaluated for multiple ones of the plurality of access point devices to determine whether the channel on which an access point device operates should be changed such that a decision to change the channel for at least one access point is limited to a localized region of the wireless network and does not necessarily affect a channel change decision for access points outside of the localized region of the wireless network. The channel on which the at least one access point device operates is changed or assigned based on the evaluation. In one form, the wireless activity data is a single metric that is derived from multiple pieces of data, each representing a different component of wireless activity determined by an AP device to be occurring in a channel.

21 Claims, 9 Drawing Sheets

U.S. PATENT DOCUMENTS

| | | |
|---|---|---|
| 2006/0019679 A1* | 1/2006 | Rappaport et al. .......... 455/456.5 |
| 2006/0022800 A1* | 2/2006 | Krishna et al. ............... 340/10.2 |
| 2006/0022801 A1* | 2/2006 | Husak et al. ................. 340/10.5 |
| 2006/0022815 A1* | 2/2006 | Fischer et al. ................ 340/505 |
| 2006/0170565 A1* | 8/2006 | Husak et al. ............. 340/825.49 |
| 2008/0071919 A1* | 3/2008 | Gupta et al. .................. 709/231 |
| 2008/0175191 A1* | 7/2008 | Obermanns ................... 370/329 |
| 2008/0225744 A1* | 9/2008 | DiGirolamo et al. ......... 370/252 |
| 2008/0225758 A1* | 9/2008 | Proctor et al. ................ 370/279 |
| 2008/0320526 A1* | 12/2008 | Franceschini et al. .......... 725/62 |
| 2009/0003219 A1* | 1/2009 | Beacham et al. ............. 370/241 |
| 2009/0012738 A1 | 1/2009 | Hart et al. |
| 2009/0154426 A1* | 6/2009 | Perraud et al. ................ 370/332 |
| 2009/0190157 A1* | 7/2009 | Ferlitsch ...................... 358/1.15 |
| 2009/0201851 A1 | 8/2009 | Kruys et al. |
| 2009/0296647 A1 | 12/2009 | Friday et al. |
| 2010/0054179 A1* | 3/2010 | Meyer ........................... 370/328 |
| 2010/0157888 A1* | 6/2010 | Aggarwal et al. ............ 370/328 |
| 2010/0157889 A1* | 6/2010 | Aggarwal et al. ............ 370/328 |
| 2011/0211490 A1* | 9/2011 | Nikula et al. ................. 370/252 |

* cited by examiner

PINNING AND CASCADING AVOIDANCE IN DYNAMIC CHANNEL ASSIGNMENT FOR WIRELESS LANS

TECHNICAL FIELD

The present disclosure relates to wireless local area networks, and more particularly to assigning channels to access point devices for operation in a wireless local area network.

BACKGROUND

A wireless local area network (WLAN) deployed in a business or enterprise environment comprises numerous access point (AP) devices, each of which is positioned in or near a building to serve wireless client devices. Wireless communication by devices in the WLAN is made in one or more frequency bands: in the case of unlicensed frequency bands, the two common frequency bands in the United States are the 2.4 GHz and the 5 GHz spectrum bands. Some AP devices designed for enterprise deployment can simultaneously operate in both the 2.4 GHz and 5 GHz frequency bands. Such AP devices have two radio transceivers and are referred to as "dual-band AP devices", indicating that they have a 2.4 GHz radio transceiver and a 5 GHz radio transceiver. When deploying numerous AP devices in a WLAN, it is necessary to assign each AP radio to a certain channel for operation in the corresponding frequency band of operation.

Dynamic Channel Assignment (DCA) schemes have been developed to determine an optimal or close to optimal channel assignment for all AP devices in a given group of AP devices, called a radio frequency (RF) group, in a WLAN deployment. An assignment of channels to all AP devices in an RF group is called a channel plan. DCA schemes can be based on graph coloring techniques, channel plan search/optimization techniques, or a combination of the two.

There are several problems with current search-based DCA schemes. One problem is referred to herein as "pinning" and involves an AP device that happens to be in a "bad spot" insofar as the RF environment is concerned, preventing other AP devices from making channel changes that may otherwise improve their performance in the WLAN. In other words, "the weakest link" AP device in an RF group prevents other AP devices from exploring better channel assignment options.

Cascading is another problem in existing DCA schemes. Cascading is the phenomenon of a channel change for an AP device causing a domino effect where too many other AP devices also change their channel, thereby resulting in network instability and degraded service availability to client devices. Pinning and cascading can be viewed as inter-related problems in the system.

One cause of both cascading and pinning in DCA schemes, in some implementations, is the way that the search for a new channel plan is performed and, in particular, the fact that any potential channel plan changes are controlled by the RF circumstances of a single AP device. A new approach to DCA is needed that ensures multiple, different AP devices can initiate local channel plan changes during any single iteration of channel plan search.

DESCRIPTION OF EXAMPLE EMBODIMENTS

Overview

Techniques are provided to determine channel assignments for wireless access point (AP) devices in a wireless local area network (WLAN). From each of a plurality of AP devices operating at least one of a plurality of channels in the WLAN, wireless activity data is received that represents activity in each channel associated with signals of devices operating in the WLAN and associated with signals and energy from devices that are not operating in the WLAN as detected by the AP devices by receiving radio frequency energy in each of the plurality of channels. During a channel plan evaluation session, the wireless activity data is evaluated for multiple ones of the plurality of access point devices to determine whether the channel on which an access point device operates should be changed such that a decision to change the channel for at least one access point is limited to a localized region of the wireless network and does not necessarily affect a channel change decision for access points outside of the localized region of the wireless network. The channel on which an access point device operates is changed based on the evaluation of one or more Cost Function (CF) metrics, (sometimes also called energy functions or metrics) that are based on measured radio frequency energy data. In one form, the wireless activity data is a single metric that is derived from multiple pieces of data, each representing a different component of wireless radio frequency (RF) activity determined by an AP device to be occurring in a channel.

Figure 1:
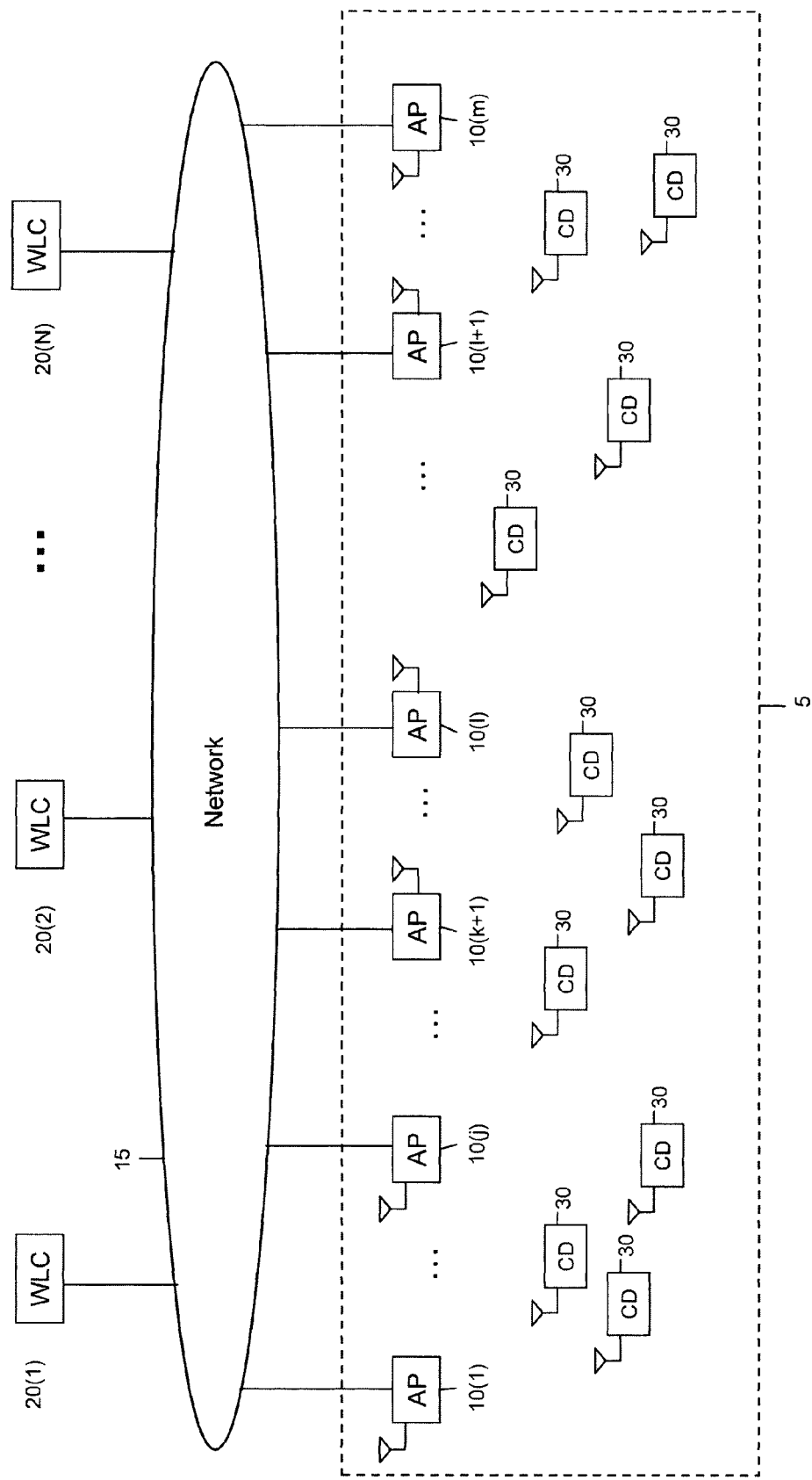
FIG. 1 is block diagram of a wireless communication environment comprising a wireless local area network in which channels for multiple access point devices are assigned according to a dynamic channel assignment procedure.

Referring first to FIG. 1, a WLAN is shown at reference numeral 5 comprising a plurality of AP devices 10(1)-10(m). Each of the AP devices 10(1)-10(m) connects to a wired network shown at reference numeral 15. WLAN controllers (WLCs) 20(1)-20(N) are provided that also connect to the network 15. The WLCs 20(1)-20(N) control corresponding groups of AP devices, and in particular assign a transmission channel to each AP device in its corresponding group. In general, each AP device may be assigned to operate on a different channel. Each AP device can serve multiple wireless client devices (CDs) 30 that operate in the WLAN 5. Wireless communication by devices in the WLAN is made in one or more frequency bands, e.g., unlicensed frequency bands, such as in the 2.4 GHz and in the 5 GHz unlicensed bands in the United States. There are multiple channels of operation in each of these unlicensed bands. There are many factors that may affect the performance of any given AP device in the WLAN 5. Examples of such factors include RF interference occurring in any channel from wireless devices that are part of another WLAN and RF energy from devices that are not WLAN devices (e.g., Bluetooth™ devices, microwave ovens, digital cordless telephones, etc.). In addition, an AP device in the WLAN 5 may contend for use of a channel with another AP device in the WLAN 5.

At the time of initial deployment of the WLAN 5, and then on a periodic or on-demand basis thereafter, the WLCs perform a dynamic channel assignment (DCA) process whereby channels for AP devices are assigned based on the factors described above. Thus, after the initial deployment of the WLAN 5 is made, the AP devices 10(1)-10(m) continuously monitor the RF environment and supply data representing the "air quality" of their respective RF environments to a corresponding one of the plurality of WLCs 20(1)-20(N).

Figure 2:
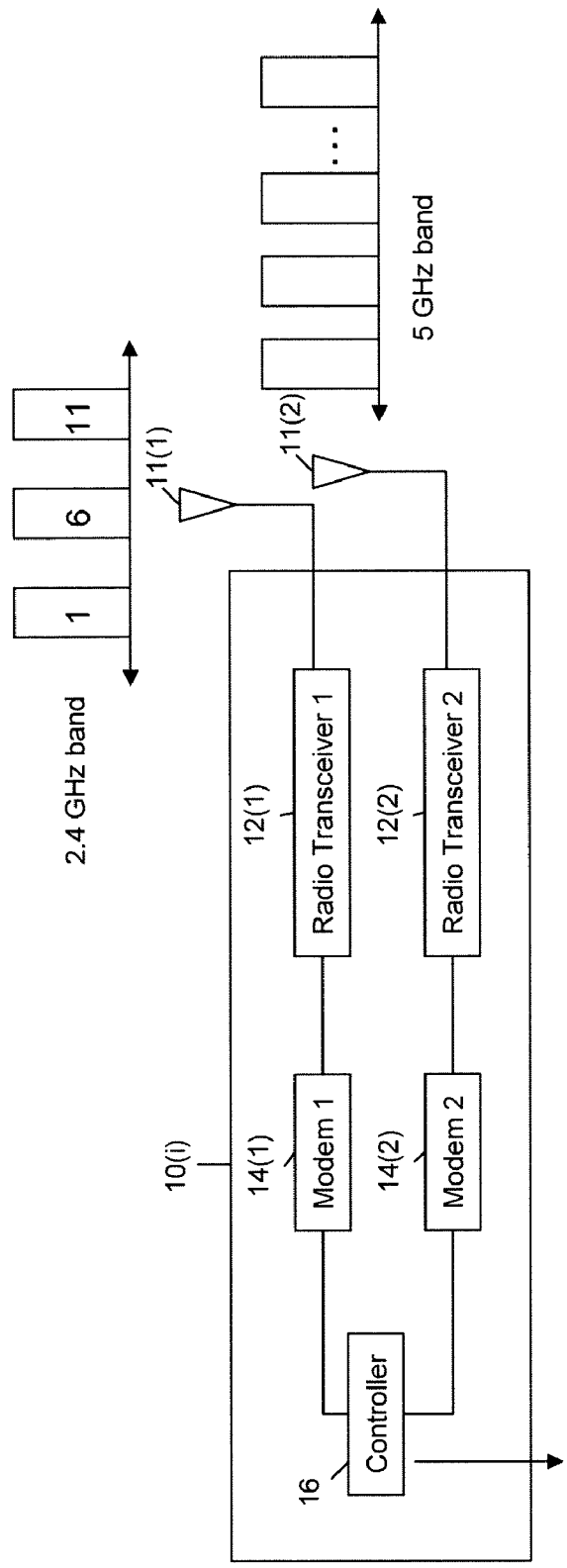
FIG. 2 is a block diagram of a wireless access point device that is configured to generate data related to activity in various channels from which channel assignment decisions are made by the dynamic channel assignment procedure.

Turning now to FIG. 2, an example block diagram is shown of an AP device, generically referred to in FIG. 2, as AP device 10($i$). Thus, FIG. 2 represents the block diagram of any AP device 10(1)-10(m) shown in FIG. 1. The AP device 10($i$) may be configured to serve wireless communication simultaneously in two different bands, e.g., the 2.4 GHz band and the 5 GHz band. To this end, the AP device 10($i$) comprises a first radio transceiver 12(1) and a corresponding modem 14(1). The first radio transceiver 12(1) transmits and receives RF signals via antenna 11(1). Similarly, there is a second radio transceiver 12(2) and a corresponding modem 14(2), and the second radio transceiver 12(2) transmits and receives signals via antenna 11(2). As an example, the radio transceiver 12(1) and modem 14(1) may be part of a WLAN chipset that is configured to serve wireless communication on channels in the 2.4 GHz band and the radio transceiver 12(2) and modem 14(2) may be part of a WLAN chipset that is configured to serve wireless communication on channels in the 5 GHz band. A controller 16 controls the two communication channel components in the AP device 10($i$). For example, the controller 16 is a microprocessor, digital signal processor, application specific integrated circuit (ASIC) (comprising programmable or fixed digital logic gates) that is configured to perform a variety of control functions. In addition, the controller 16 is configured to control the radio transceivers 12(1) and 12(2) and modems 14(1) and 14(2) to capture data from these components in order to compute data related to the "air quality" factors for each channel shown in FIG. 2.

When reference is made herein to a channel of an AP device, it is to be understood that this refers to a channel used by one of possible several radio transceivers in an AP device since an AP device may have multi-band service capability as depicted in FIG. 2. Thus, an AP device may be assigned different channels (in different frequency bands) for each of its different band-specific radio transceivers.

The air quality factors referred to above are now described. A first factor (also referred to herein as a "contention factor") relates to the competition that an AP device 10(1)-10(m) has for use of a given channel with respect to other AP devices operating in the WLAN 5 as well as the overlapping channel interference that may occur in a channel from nearby AP devices in the WLAN 5. A second factor pertains to interference in a channel caused by devices that are WLAN devices but are not part of the WLAN 5, such as AP devices and/or wireless client devices that are operating in another WLAN, or so-called "rogue" AP devices that may be operating in a channel but are not part of a legitimate WLAN. A third factor relates to interference in a channel caused by non-WLAN devices, such as Bluetooth™ devices and other such devices that operate or emit energy in the unlicensed band. Each AP device sends these metrics to a WLC that is assigned to manage it. As explained hereinafter, the WLC converts these physical metrics into a single mathematical metric that is referred to herein as the CF metric.

Figure 3:
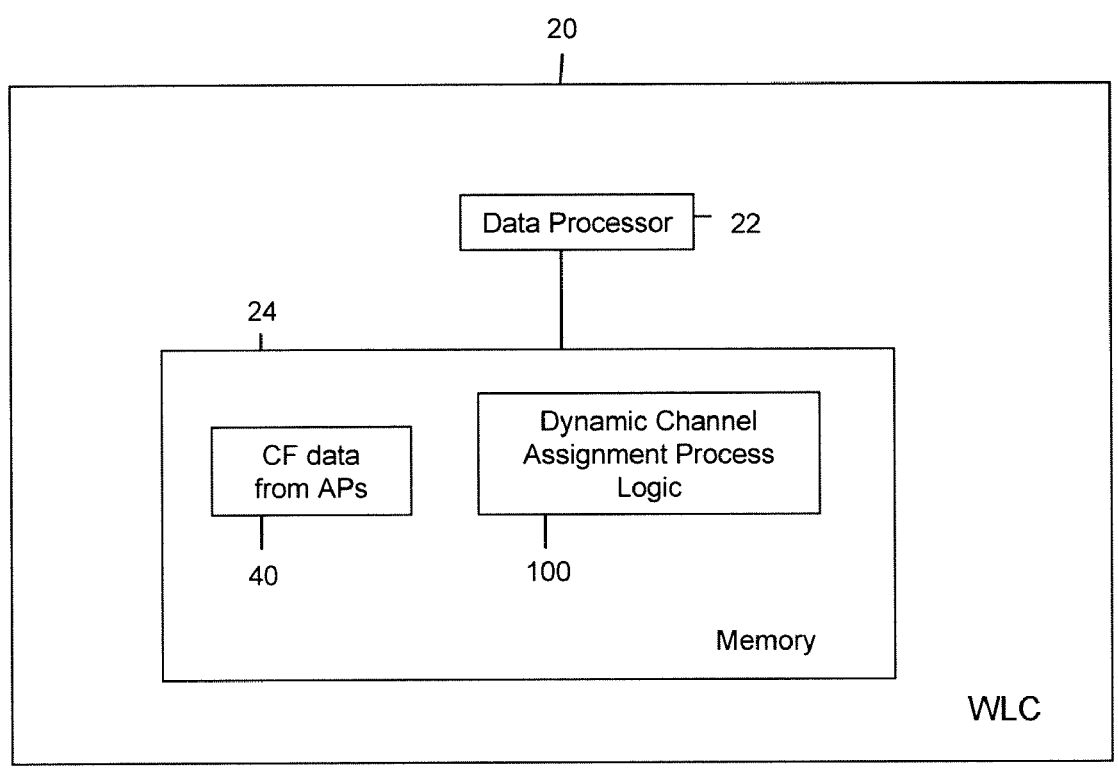
FIG. 3 is a block diagram of a controller apparatus that is configured to perform the dynamic channel assignment procedure.

Turning now to FIG. 3, an example of a block diagram of a WLC 20($i$) is shown. Each WLC 20(1)-200(N) shown in FIG. 1 has a configuration like that shown in FIG. 3. The WLC comprises a data processor 22, e.g., one or more computer processing devices (microprocessors, digital signal processors, application specific integrated circuits configured for processing functions with programmable or fixed digital logic gates, etc.) a memory 24 and a network interface 26. The network interface 26 enables communication for the WLC 20($i$) via the network with AP devices. The memory 24 stores, among other things, air quality data (the aforementioned metrics derived by AP devices) shown at 40. In addition, the memory 24 stores software instructions associated with dynamic channel assignment process logic 100. The data processor 22 executes the instructions stored in the memory 24 associated with the dynamic channel assignment process logic 100 to perform a dynamic channel assignment process. The dynamic channel assignment process logic 100 is described in more detail hereinafter in conjunction with FIGS. 4-8.

In general, the dynamic channel assignment process may be viewed as a multi-stage process. Initial channel assignment is made at deployment of the network based on path loss information between AP devices. Thereafter, channel searching is employed using the techniques described herein. During a period of time following initial deployment of the AP devices, a first channel searching stage occurs when it is desired to more aggressively search for better available channels based on the three factors or metrics described above (contention, WLAN interference and non-WLAN noise). After the first channel searching stage, there is a second channel searching stage when it is desired to be less aggressive in searching for better available channels based on the same metrics as during the first stage, or in some cases, based on different metrics. The first channel searching stage is also referred herein to as an aggressive channel searching stage and the second channel searching stage is referred to herein as the steady stage channel searching stage.

Figure 4:
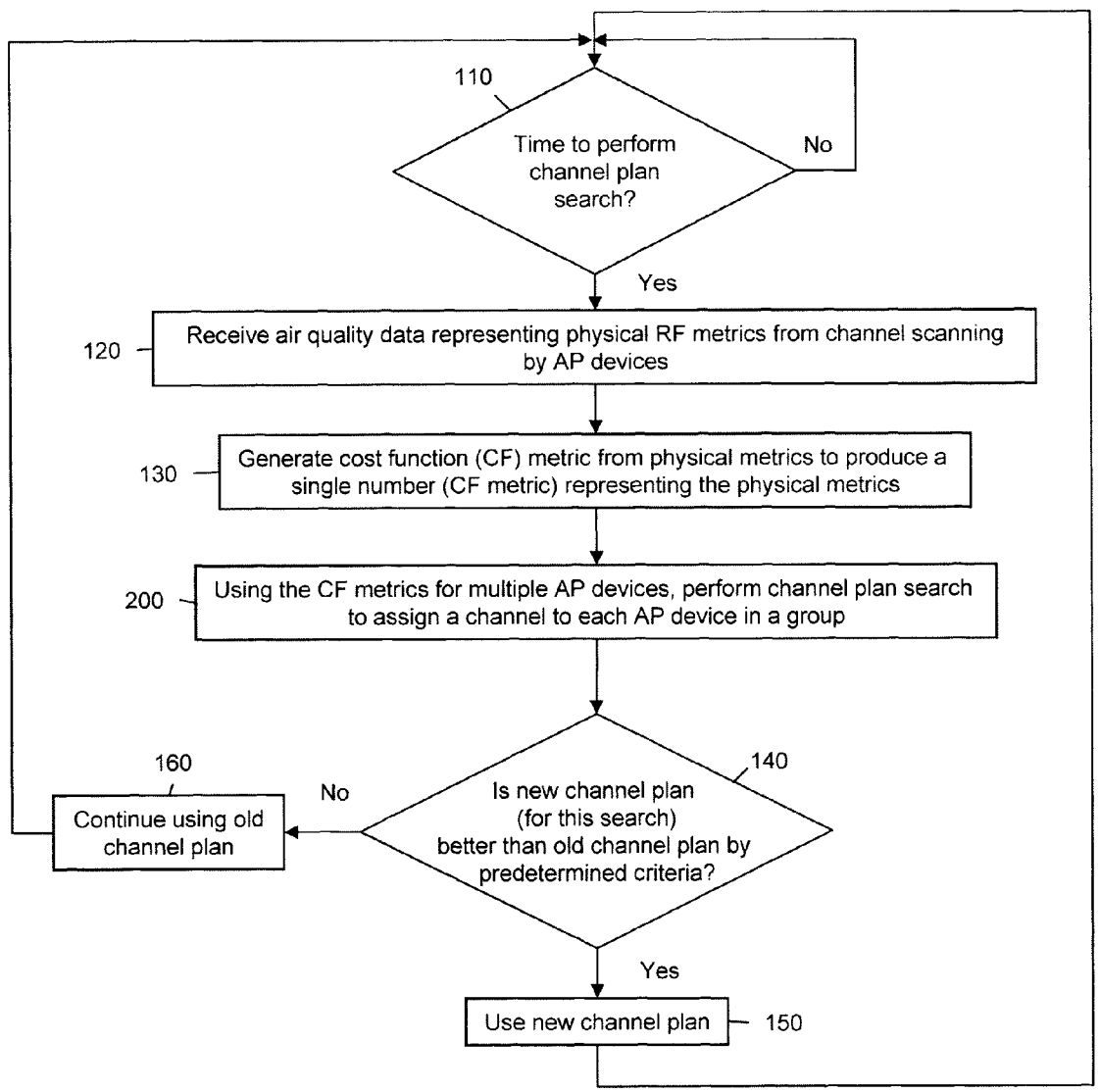
FIG. 4 is an example of a flow chart for the dynamic channel assignment procedure.

Turning now to FIG. 4, a high level view of the dynamic channel assignment process logic 100 is now described. After initial channel assignment at WLAN deployment, channel plan searches are run on a periodic (or perhaps on-demand) basis. At 110, it is determined whether it is time to perform a new channel plan search. Immediately after the initial WLAN deployment, the aggressive search referred to above is run in order to explore as many different channel plans as possible during an initial period of time, e.g., 100 minutes, following initial WLAN deployment. Thereafter, steady state channel plan searches are run. Parameters for the channel search analysis and decisions employed during the aggressive search stage and the steady state search stage are described hereinafter.

When it is determined at 110 that it is time to run a channel plan search, then the process proceeds to 120 whereby the WLC receives and stores air quality data derived from channel scanning performed by AP devices under its control. A WLC may be continuously receiving the air quality data from its AP devices, or may command the AP devices to perform channel scanning and report air quality data. At 130, the WLC analyzes the physical metrics obtained from the air quality data in order to produce a single CF metric (a single number) from these multiple air quality metrics. The WLC generates a single CF metric for each applicable channel for each AP device under its command. That is, the CF evaluations (on which channel plan search optimization is based upon) are done on a per-channel, per-AP-radio basis.

The physical noise and interference metrics may be captured as receive signal strength (RSSI) values. For purposes of illustration, the following example is provided. Consider an RF environment where, for a particular AP radio in the 2.4 GHz spectrum band, the following RF activity data for Channel 1 (which is the lowest frequency available channel in this spectrum band) is occurring:

overall WiFi™ WLAN interference (comprised of same channel contention, overlapping contention, and foreign/rogue interference) adds up to −83 dBm; and overall noise (that is, all non-WiFi WLAN energy combined) adds up to −82 dBm.

For the same RF environment and the same AP device's 2.4 GHz radio, on Channel 6 the following activity is occurring:

overall WiFi WLAN interference (comprised of same channel contention, overlapping contention, and foreign/rogue interference) adds up to −90 dBm; and overall non-WiFi WLAN noise adds up to −88 dBm.

In this example, assuming that the Cost Function (i) captures both noise and interference, but (ii) does not take into account other parameters, e.g., nature of the interferer (such as duty cycle and other properties) aside from the RSSI values listed above, then any such reasonable Cost Function would give preference to Channel 6 over Channel 1 for that AP radio because both the interference physical metric (RSSI value) and the noise physical metric (the other RSSI value) are better (for RSSI values, better means lower) for Channel 6 than for Channel 1. A more refined (and complex) Cost Function would additionally take into account the duty cycles of an interferer and other RF activity data. Assuming all other RF activity data (besides the noise and interference RSSI values) for the two channels were exactly the same, Channel 6 would again be preferred to Channel 1 because both respective interference and noise values for Channel 6 are better than the respective interference and noise values for Channel 1.

Next, the WLC performs a channel plan search procedure at 200 using the CF metrics for all channels for all AP devices under its control. This procedure is described in detail hereinafter in connection with FIGS. 5-8. The output of the procedure 200 is a "new" channel plan comprising channel assignments for AP devices under the WLC's control. At 140, the WLC compares the new channel plan with the current or "old" channel plan to determine if it will actually improve network performance based on one or more criteria.

A single session or iteration of DCA channel plan search algorithm, that is performed as explained above and as will be described in more detail hereinafter, is generally comprised of multiple local channel plan searches. Each such local channel plan search starts by selecting a single AP radio, heretofore referred to as Channel Plan Change Initiator (CPCI), and then determining the best channel for that single AP radio, where "best" is defined with respect to the individual cost metric applied to this particular AP radio.

One criterion used for determining which channel plan to adopt is the CPCI's CF metric value in the new plan vs. the CPCI's CF metric value in the old (that is, existing) channel plan. In some implementations, an additional bias is added, so that the new CPCI's CF value has to be better than the old CF metric value by at least the threshold amount as specified by the bias. The purpose of adding such a bias is to ensure network stability, i.e., that new channel plans be adopted only if a relatively considerable improvement in WLAN performance can be expected.

In addition to the CPCI CF metric evaluations for the new and the old channel plans, other criteria can be also used to determine whether the new channel plan should be adopted. In some implementations, those additional criteria may be based on cumulative cost metrics, that is, cost metrics that capture the RF conditions on a particular channel not just for a single AP radio (for the CPCI radio), but for an entire group, region or neighborhood of AP radios. Adding a cumulative cost function to the channel plan evaluation criteria may help ensure that channel plan changes that benefit one AP device but possibly hurt performance of other AP devices are either not adopted, or else more carefully examined insofar as the tradeoffs involved.

Once the set of channel plan comparison criteria has been established, a tentative new channel plan is obtained based on (i) finding the most optimal channel for the current CPCI radio alone, and (ii) making appropriate channel adjustments to the one-hop neighbors of the CPCI radio, under the assumption that the CPCI would adopt the new channel. Once such a tentative new channel plan is devised, it is compared against the old (i.e., existing) channel plan with respect to aforementioned criteria (such as the CF improvement of CPCI and the cumulative cost function improvement). When it is determined that the new channel plan is better than the old channel plan, then the new plan is used as indicated at 150. Otherwise, the old channel plan is continued to be used as indicated at 160.

Figure 5:
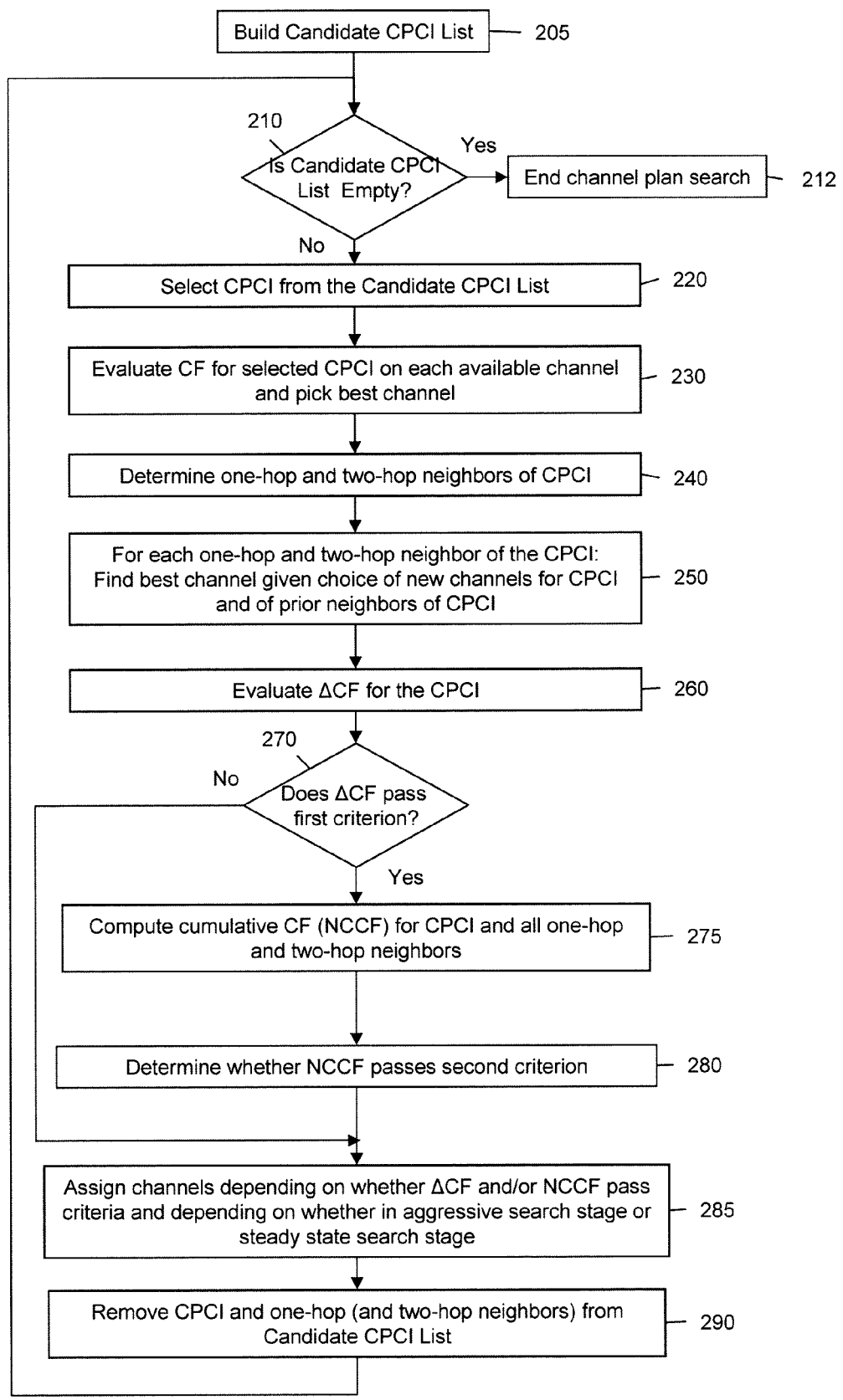
FIG. 5 is an example of a flow chart for a channel search process forming a part of the dynamic channel assignment procedure.

Turning now to FIG. 5, the channel plan search procedure 200 is described in more detail. The channel plan search procedure 200 involves performing multiple local channel plan searches among AP devices and limiting or isolating these local channel plan searches. In addition, selection of the AP device that is used as an initiator for a channel plan selection is not based on position or physical location of the AP device. In fact, selection of the AP device may be random as described hereinafter.

An AP device that is selected for channel plan evaluation during a channel plan search iteration is referred to herein as a channel plan change initiator (CPCI). The channel plan search procedure 200 is designed to consider multiple CPCIs during a single channel plan search session so that, unlike prior channel plan scheme, the AP device with the "worst" case performance is not the only AP device that is used to determine the channel plan for a group of AP devices. Performing multiple local channel searches/evaluations with different AP devices prevents one part of the WLAN from controlling the channel assignments of AP devices in other regions of the WLAN.

The following summarizes the channel plan search procedure 200 shown in FIG. 5. At each of a plurality of AP devices operating on one of a plurality of channels in a wireless network, RF energy is received in each of the plurality of channels. Each AP device generates at least one metric representing activity in each channel associated with signals of devices operating in the wireless network and associated with signals and energy from devices that are not operating in the wireless network. During a channel plan evaluation session, the at least one metric for multiple ones of the plurality of access point devices is evaluated to determine whether the channel on which an access point device operates should be changed such that a decision to change the channel for at least one access point is limited to a localized region of the wireless network and does not necessarily affect a channel change decision for access points outside of the localized region of the wireless network. A decision is then made as to whether to change the channel on which the at least one access point device operates based on said evaluating.

With that summary as background, the procedure 200 is now described in more detail. A list of candidate CPCIs is established at the beginning of each channel plan search session or iteration; this list of candidate AP radios for future CPCIs within the current DCA session is referred to herein as a Candidate CPCI List. In some implementations, the initial members of this list are composed from all of the AP devices in a given RF group that is to be covered by a channel plan search. Each local search starts from a different CPCI, which is a particular AP device (and specifically a particular radio within an AP device if the AP device has multiple radios, one for a different frequency band comprised of multiple channels) whose channel change triggers/enables adopting a new channel plan for an entire RF neighborhood. During a channel plan search iteration, AP devices are removed from the Candidate CPCI List as the CF metric for an AP device (and certain neighboring AP devices) are evaluated. Thus, the Candidate CPCI List is initially populated with numerous AP devices, and then it is reduced eventually to an empty state. It is desirable to consider multiple CPCIs during a channel plan search session, but also to reduce the number of individual evaluations that need to be made by removing multiple AP devices from the Candidate CPCI List as appropriate.

Thus, the procedure 200 begins at 205 by building the Candidate CPCI List for a channel plan search session. The procedure 200 begins in earnest at 210 by first determining whether the Candidate CPCI List is empty. At the first pass through, the Candidate CPCI List will not be empty. When the Candidate CPCI List is determined to be empty at 210, then the channel plan search session ends at 212. When there is at least one CPCI remaining in the Candidate CPCI List, the process proceeds to 220. There are multiple ways to the select the next CPCI for evaluation, such as by using a random selection or based on the CF metric of the CPCIs in the Candidate CPCI List. The CPCI selection process is described in more detail hereinafter in connection with FIG. 8.

Next, at 230, the CF metric for the CPCI is evaluated on each available channel for that CPCI in order to select or identify the "best" channel for that CPCI. As explained above, the CF metric combines or converts the multiple air quality metrics into a single metric or number. To give an oversimplified example for illustrative purposes, assume a very simple Cost Function that is concerned with the overall WiFi interference and the overall WiFi noise (but not about interferers' types, duty cycles or any other parameters), and that the Cost Function is simply a sum of overall noise and overall interference, the CF metric would be computed as follows.

A 2.4 GHz AP radio that evaluates the appropriateness of Channel 1 as its transmit channel. If the overall interference on Channel 1 is −83 dBm, and overall noise is also −83 dBm, then the Cost Function evaluated as CF=Noise+Interference would be equal to (−83 dBm)+(−83 dBm)=−80 dBm (Note: RSSI values, measured in dBm, are on a logarithmic scale. Doubling the RF energy leads to an increase by 3 dB, hence the arithmetic in the previous example works out as indicated.)

A CF metric is generated for a CPCI for each channel that is available to that CPCI (in each of multiple frequency bands if that CPCI has multi-band operation capability). A preliminary selection or identification of the best channel available to the CPCI in each of the frequency bands is made at 230 based on the CF metrics for those channels.

Figure 6:
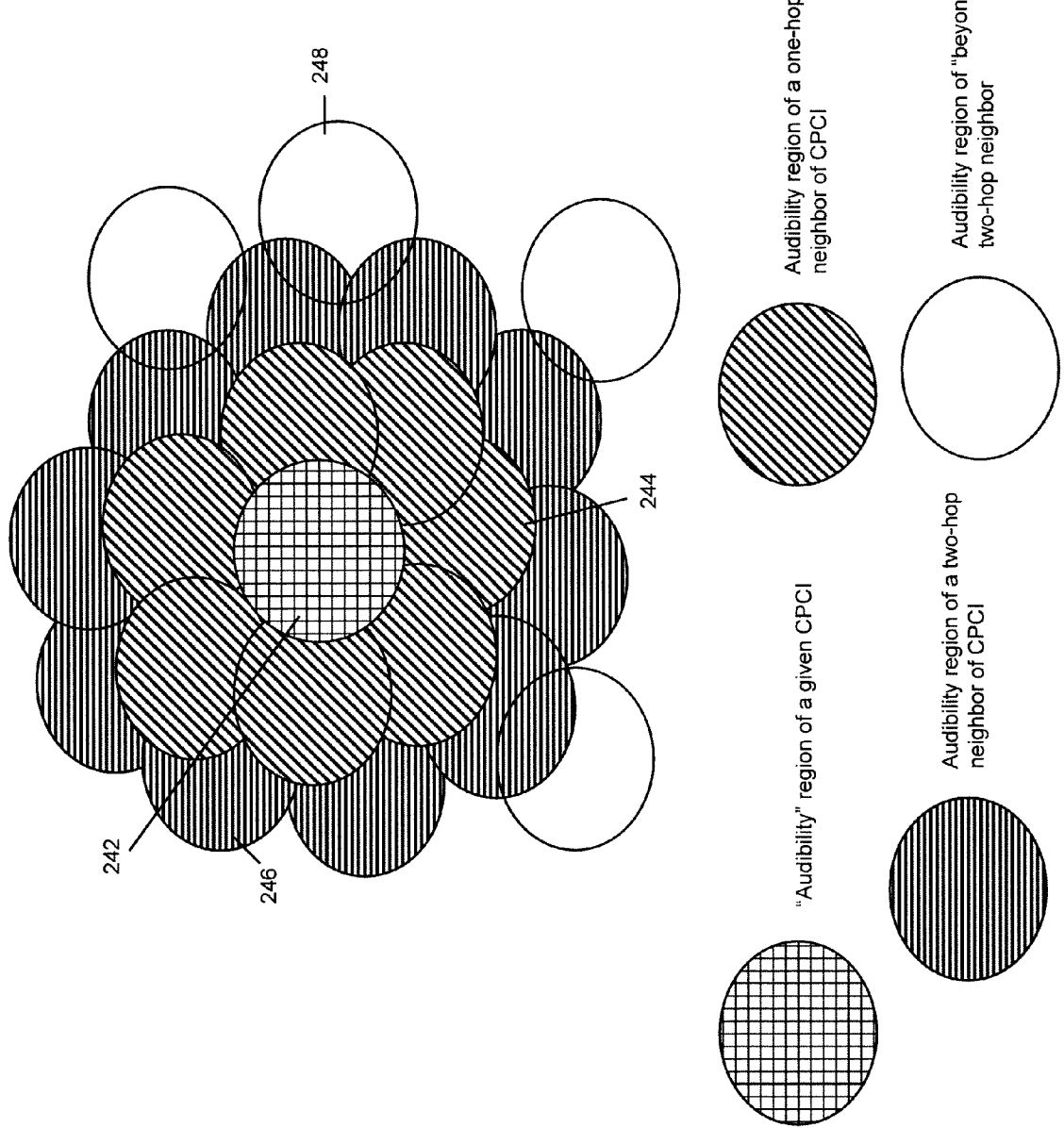
FIG. 6 is a diagram illustrating an example of neighboring access point devices with respect to a given access point device for purposes of considering the impact of channel assignment during the channel search process.

At 240, so-called one-hop and two-hop neighbors for the CPCI are determined. The concept of neighbor AP devices is now described with reference to FIG. 6. For any given CPCI, there is a localized region of the WLAN that is to be considered when evaluating whether to change a channel for a given AP device. This localized region, or RF neighborhood, depends on the receive signal strength information (RSSI) that other AP devices have for signals transmitted by the selected CPCI. FIG. 6 shows that for a given CPCI, there is an "audibility" region shown at 242 where the RSSI associated with a signal transmitted by the CPCI exceeds a threshold. A one-hop neighbor for a CPCI is an AP device that is within the audibility region of the CPCI, that is, within a region in which the RSSI exceeds this threshold. Examples of one-hop neighbors and their corresponding audibility regions for a given CPCI are shown at 244. Furthermore, AP devices that are within the audibility region of any one-hop neighbor of the CPCI, but are themselves not one-hop neighbors of CPCI, are referred to as two-hop neighbors of the CPCI. Examples of two-hop neighbors of the CPCI (and their associated audibility regions) are shown at 246. There may be other AP devices that are outside the audibility region of any one-hop neighbor and these devices and the audibility regions for these devices are shown at 248. Thus, at 240, the AP devices that qualify as either one-hop or two-hop neighbors of the CPCI under evaluation are identified. This part of the procedure 200 serves to limit the consideration of the impact of a channel change to a localized region of the WLAN with respect to a CPCI under evaluation. As explained hereinafter, the size of the localized region considered depends on whether the search is being run during the aggressive search stage or the steady state search stage. Another way to view one-hop neighbors is that they make up a smaller RF neighborhood around a given CPCI, and the combination of one-hop and two-hop neighbors make up a larger RF neighborhood around a given CPCI.

At 250, for each one-hop and two-hop neighbor of the CPCI under evaluation, the best channel is determined given the choice of new channels for the CPCI. More specifically, the CF metric (single number) for each one-hop and two-hop neighbor is evaluated for each channel available to each one-hop and two-hop neighbor in order to at least preliminarily identify which of the available channels, for each one-hop and two-hop neighbor, would be the best channel based on the respective CF metrics.

At 260, the CF metric for the best channel determined at 230 is compared with the CF metric for the previously assigned channel for the CPCI to produce a difference or "delta" CF (ΔCF) value. At 270, the ΔCF is compared with a first "pass" criterion or threshold to ensure that the new channel is given further consideration for the CPCI only if its CF metric is better than the CF metric for the previous or old channel by some amount. If the pass criterion is not met at 270, the procedure jumps to 285 described hereinafter.

Next, at 275, a cumulative CF is computed to account for the CF metric for the CPCI and for the CF metrics associated with the best channels (determined at 250) that would be used for all of its one-hop and two-hop neighbors, given the best channel choice for the CPCI (that passed the criterion at 270). The purpose of the cumulative CF is to take into account the overall performance of the entire relevant RF one-hop and two-hop neighborhood for the CPCI under evaluation. This cumulative cost function can be an absolute value, or a ratio (i.e., normalized so that its magnitude does not exceed 1). In some implementations, it is advantageous to use a normalized cumulative CF (NCCF) as opposed to an absolute (not normalized) one, because different RF neighborhoods may vary considerably in size (i.e., how many AP devices they contain), and hence a normalized cumulative CF provides a better criterion across a broad range of possible neighborhood sizes.

After the NCCF for an appropriate RF neighborhood of the CPCI has been computed, then at 280, the new channel plan's NCCF is compared to the old channel plan's NCCF value as a second pass criterion.

In some implementations, at 285, channel assignments are made to the current CPCI under evaluation and its one-hop neighbors depending on the outcomes of the comparisons at 270 and 280 and also depending on whether the channel search session is being run during the aggressive search stage or steady state search stage. This function is described in further detail hereinafter.

At 290, in some implementations the CPCI and its one-hop (and two-hop neighbors, depending on whether in the aggressive search stage or steady state search stage) are removed from the Candidate CPCI List. The process then repeats at 210. At this point, the Candidate CPCI List has been reduced by the CPCI under evaluation at the previous iteration as well as all one-hop (and perhaps also two-hop) neighbors of the CPCI. Thus, each time a single local search within a channel plan search session is performed, the CPCI (and its appropriate RF neighbor AP devices) are deleted from the Candidate CPCI List so that the next CPCI cannot be an AP that is in the RF neighborhood of the prior CPCI. After one pass or iteration through the procedure 200 for a given CPCI, it is possible that a new channel may be selected for the CPCI and for each of its associated one-hop (and possibly two-hop neighbors), or not, but in either case, both the CPCI and its one-hop (and possibly two-hop neighbors) are removed from the Candidate CPCI List for purposes of the determining the selection of a next CPCI for evaluation at the next iteration. This method of systematically shrinking the Candidate CPCI List ensures eventual convergence of the channel plan search procedure, for eventually (assuming no other exit criteria have been met) the Candidate CPCI List will become empty, at which point the procedure stops.

While FIGS. 4 and 5 depict the use of a CF metric for purposes of channel searching analysis, it is to be understood that these procedures are applicable more generally for channel searching analysis on the basis of wireless activity data representing activity in each channel associated with signals of devices operating in the WLAN 5 and associated with signals and energy from devices that are not operating in the WLAN (whether from a foreign WLAN or from non-WLAN devices) as detected by the AP devices by receiving RF energy in each of the plurality of channels. In this regard, the term "CF metric" in many parts of the process 100 may be replaced by the term "wireless activity data" or the term "RF energy data".

Using a mechanism involving multiple localized channel plan searches such as the one described above, effective bounding is achieved of the impact an CPCI's channel change may have on the rest of the AP radios in an RF group. This ensures that no single radio can cause the domino effect with respect to the overall channel plan for the entire RF group (which may comprise several hundreds APs). In summary, since the only way a channel plan change can happen is by selecting a CPCI, and since this mechanism is applied across all CPCIs, it follows that for any particular DCA iteration comprised of several CPCI-driven local channel plan searches, it can be guaranteed that it will be cascading-free.

For example, assume a CPCI is selected and that its channel change would improve its CF metric sufficiently (that is, the difference between CF metrics on new and old channels exceeds an applicable hysteresis threshold), so that the new channel plan for the RF neighborhood is adopted. If this does not hold, then the CPCI and its neighborhood all stick to the existing channel plan, so obviously there can be no cascading.

This single channel change affects the one-hop neighbors' CF values on at least two channels, the CPCI's old channel's and its new channels for the neighbors that can receive signals from the CPCI. Some of one-hop RF neighbors of the CPCI may also change their channels, as well. This, in turn, in general may affect the CF values for the CPCI's proper two-hop neighbors on some of the channels; these are the radios of APs within one-hop (in the RF/RSSI sense) from the CPCI's one-hop neighbors. However, the mechanism of multiple localized channel plan searches guarantees that, while the CF metrics for these proper two-hop neighbors will be re-evaluated, none of them (which are two hops away from the CPCI) will be allowed to change channel. Hence, the CF on transmit (and all other) channel(s) of the APs that are three or more RF hops away from the CPCI are not going to be affected by the local channel plan change.

Consequently, no AP three or more hops away from CPCI will change the channel, at least not as a result of this CPCI's channel change, i.e. not as a part of this local search. Thus, given a CPCI, all channel changes are confined to a one-hop RF neighborhood of that CPCI, and all impact on the CF metrics for APs is confined to a two-hop RF neighborhood. Moreover, this applies to any CPCI, regardless of how that CPCI was selected. Therefore, no single AP can ever cause a cascading effect.

As explained above, there is an aggressive search stage that is performed during a period of time after initial deployment and channel assignment of AP devices in the WLAN. A steady state search stage follows the aggressive search stage.

During the aggressive search stage, a goal is to explore as many channel plans as possible and reasonable. In doing so, it is also desirable to reach a channel plan that is stable and close to optimal once the aggressive search stage ends and steady stage searching begins thereafter. In this regard, one technique for the aggressive search stage is to perform more iterations within the same available time. For example, every 10 minutes, a "mini-batch" of k iterations are performed, that is, k passes through the flow chart shown in FIG. 5. If 100 minutes are allocated to the aggressive search stage, then 10 "mini-batches" are run one every 10 minutes.

In an example where k=6, the actual channel plan changes can take place only at the end of a current mini-batch (i.e., after $6^{th}$, $12^{th}$, $18^{th}$, etc., iterations). On all other iterations, no physical/observable channel plan changes are made. Consequently, to the network system administrator, the actual physically changed channel plans occur after k iterations and therefore only up to 10 plan changes are possible within the first 100 minutes of an aggressive channel search stage.

During the aggressive search stage, one important goal is to prevent pinning. Cascading, though not desirable, is nevertheless tolerable during the aggressive search stage (e.g., in some implementations, during the first 100 minutes). Consequently, in one form, after a CPCI is evaluated through the procedure 200 shown in FIG. 5, the removal at function 290 of a CPCI and its smaller neighborhood (e.g., one-hop neighbors (and not its two-hop neighbors) are removed from the CPCI Candidate List. This means that during the aggressive stage, the search process is more exhaustive and it will take somewhat longer to go through the entire CPCI Candidate List, but this is desirable during this initial more aggressive search stage.

Furthermore, during the aggressive search stage, the channel plan is changed if the CF metric for the CPCI alone passes the pass criterion at 270 or if the NCCF for the CPCI and its one-hop and two-hop neighbors passes the pass criterion at 280. This is a Boolean "OR" function of, in this instance, two pass criterion, thought it may comprise an "OR" function of more than two criteria. In any event, during the aggressive search stage, the new channel plan is adopted if any one of the pass criteria is met. Moreover, the threshold for evaluation at 280 may be set to different values, based on particular design or implementation considerations. For example, CF metric changes of less than 5 dB may be ignored, or else the threshold can be lowered in order to take into account changes in CF of less than 5 dB.

On the other hand, during the steady state search stage, the decision of whether to adopt a new channel assignment for a CPCI and its one-hop neighbors is based on individual improvement for the CPCI, e.g., the test at 270, and based on improvement in the one-hop and two-hop RF neighborhood for the CPCI at 280. During the steady state search phase, stability and cascading avoidance are the main design priorities. Hence, adopting a new channel plan is to be made harder than during the aggressive search; and a Boolean "AND" function of two (or more) pass criteria is applied at 285. Both pass criteria at 270 and 280 must be met for a new channel plan to be adopted.

In addition, during the steady state searching stage, a main concern is to prevent cascading (a domino effect of channel plan change propagation across many AP devices). Thus, the removal at function 290 of a CPCI and its neighbors during the steady state searching stage includes removal of the two-hop neighbors as well as the one-hop neighbors from the Candidate CPCI List. Consequently, a single iteration during the steady state stage should take considerably fewer CPCIs for sufficiently large RF groups, thus requiring less computation cycles than a single iteration during the aggressive search stage. Thus, during the steady state stage, the CPCI Candidate list is exhausted faster than in the aggressive search stage.

Figure 7:
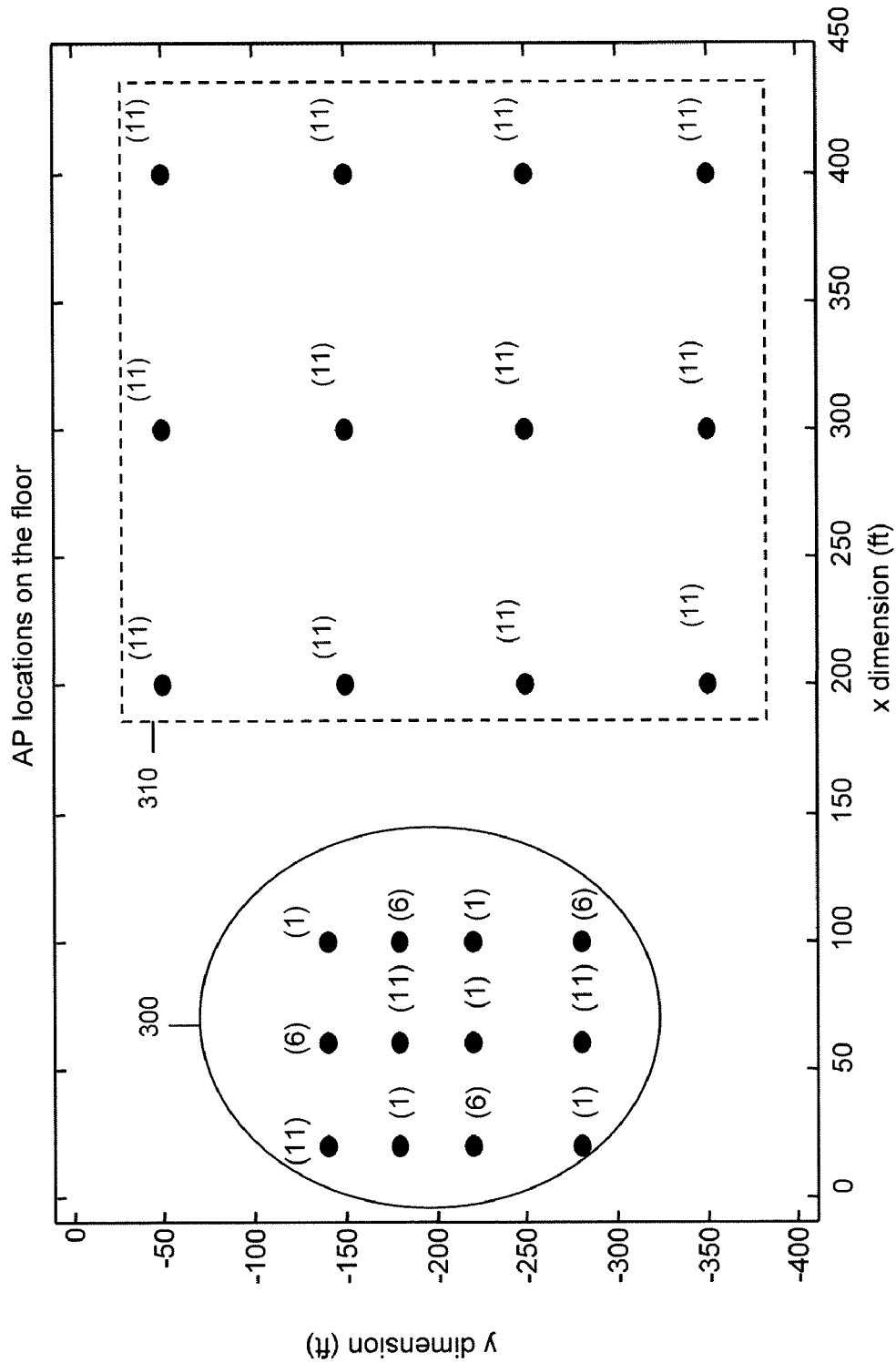
FIG. 7 is a diagram illustrating groups of access points in a wireless network and depicting a scenario where certain access points are subject to pinning with existing channel assignment schemes.

Turning now to FIG. 7, an example is shown of an extreme case of pinning. AP devices shown in the region 300 are all much closer to each other than the AP devices in the region 310. Using existing channel planning techniques, the CPCI selected at 220 during an iteration of a channel plan search would be selected solely on the basis of "badness" of the CF metric, and an AP device in the region 300 will always be one that is selected. The so-called "badness" of a metric refers to a metric that indicates degree of poor performance on a channel. Consequently, AP devices in the region 310 are "pinned" in that they could not improve their CF metric because they are currently operating on the same channel, e.g., channel 11, and will not have the opportunity to be assigned to a new channel since all the channel plan improvements will take place and be centered around the AP devices in the region 300.

Figure 8:
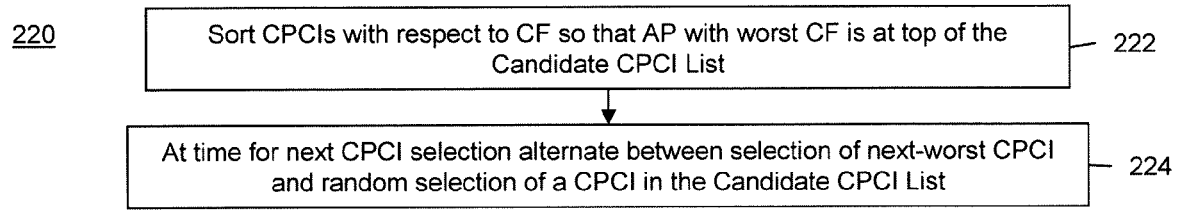
FIG. 8 is a flow chart illustrating examples of techniques for selecting the next access point in the channel search process in order to avoid the pinning scenario.

To this end, as shown in FIG. 8, a technique for selecting the next CPCI at 220 is now described that improves on the one that relies on "badness" of a CF metric alone. This technique combines randomization as well as the CF metrics for CPCIs in the Candidate CPCI List. At 222, the CPCIs in the Candidate CPCI List are sorted with respect to "badness" of CF metric so that the CPCI with the worst CPCI is at the top of the list or is otherwise in line to be selected first.

At 224, each time a single local search is to be performed and the next CPCI is to be selected, selection of the next CPCI is based on either a random selection procedure or based on "badness" of the CF metric for those CPCIs remaining the Candidate CPCI List, from one iteration to the next. For example, the selection process can alternate from one iteration to the next between randomly selecting a CPCI and selecting a CPCI from the Candidate CPCI List based on "badness" of the CF metric. Furthermore, the CPCI selection process may be based on a random selection with respect to a uniform probability distribution or with respect to a non-uniform probability distribution. An example of a non-uniform probability distribution is one that gives a greater probability of selection to those CPCIs with worse CF metrics (those CPCIs whose metric indicates worse performance on a channel) over those CPCIs with better CF metrics. For example, a probability of ½ is assigned to selecting the CPCI with the next worse CF metric, a probability of ¼ is assigned to selecting the CPCI with the second worse CF metric, and so on, such that total probability is 1. As another example, a continuous non-uniform probability distribution (e.g., a Poisson distribution) may be used for determining the selection of the next CPCI, where such continuous, non-uniform probability distribution has to be appropriately discretized since there are a finite number of CPCIs to chose from at any given selection opportunity. Moreover, the manner in which the selection process alternates may be configured such that at odd iterations ($1^{st}$, $3^{rd}$, etc.), a random selection is employed and at even iterations ($2^{nd}$, $4^{th}$, etc.), a selection is made based solely on the "badness" of the CF metric, that is, select the CPCI with the worst CF metric.

When selecting the next CPCI at 220 in FIG. 4, it is possible to select not just one CPCI but several CPCIs from the Candidate CPCI List, e.g., j CPCIs at each iteration. Furthermore, the selection technique may involve alternating, at successive iterations, between randomly picking j CPCIs and deterministically, based on CF metric, selecting j CPCIs.

Employing randomness in the selection of the next CPCI during a channel search iteration serves to de-correlate from the location of an AP device where channel plan optimization is done. Thus, location of the AP device does not drive the next CPCI selection process when randomness is used. This has several advantages. Individuals who design the WLAN equipment (AP devices and the WLCs) are different from and thus have no control over the persons that actually deploy the WLAN equipment. For example, it is possible that AP devices may be alphabetically sorted by AP name and then placed on the walls/ceilings of a building according to such a sorting scheme. In this case, there would be a high correlation of the names or identifiers, e.g., media access control (MAC) or Internet Protocol (IP) addresses, and their positions/physical locations. Using randomness in selecting where to perform a channel plan search ensures that locations of AP devices are de-correlated from any other attributes, e.g., names, IP addresses, MAC addresses, or any other types of identifiers. Consequently, even if the WLAN deployment is made by a person who is completely ignorant of channel planning considerations or even by a person who intentionally attempts to create channel pinning issues, using randomization ensures that (i) in the long run, pinning is provably prevented with a very high probability and (ii) that fairness in channel assignment is essentially guaranteed.

Depending on the desired level of channel plan search aggressiveness, constraints can be imposed on the total number of CPCIs per RF group in a single iteration of the channel plan search procedure. In some implementations, the procedure can be made to be very aggressive by continuing to select CPCIs (and removing the appropriate RF neighborhood of the current CPCI from the list of candidate CPCIs once the new local channel plan for that neighborhood has been evaluated), until available candidate CPCIs are exhausted. In other implementations, an upper bound on the total number of CPCIs can be imposed for an RF group. That bound may be defined in absolute terms (a positive integer) or relative terms (i.e., an appropriate fraction of the total number of AP device radios in the RF Group).

Consider a deployment scenario such as that shown in FIG. 7 where, on one side of a floor of a large building or warehouse, AP devices are densely packed (e.g., the nearest physical neighbors are 40 ft. apart) in the region 300 whereas on the other side AP devices are sparsely packed in the region 310 (e.g., the nearest neighbors are 100 ft. apart). From the RF environment and pathloss standpoint, a similar situation may arise if one has two different, adjacent floors with very different densities of AP deployment, so that APs on different floors can "hear" each other (and all APs belong to the same RF group).

Again, in this example, each AP device has a 2.4 GHz, 802.11b/g radio transceiver. Assume that a DCA search has been run for some time already in the dense half of the deployment, and the channel assignment search for the 12 AP devices on that side of the building (alternatively, that floor) has converged to a stable channel plan (assuming no further changes in input parameters). The 12 AP devices in the sparse half of the deployment (alternatively, on the different floor) are "turned on" at a later time, and then the DCA searches are run on them.

Because the AP devices in region 310 are far apart from each other, as well as from the AP devices in the region 300, one would expect that assigning a good channel plan to them would be easy. However, if current channel planning schemes were employed, the only channel plan change initiator there is the single "worst" radio, which (due to high density) is always one of the radios in the region 300. Since that radio cannot improve enough by moving to any other channel to initiate an actual channel plan change, it prevents everyone other AP in the entire deployment, including the AP devices in the second region 310 to seek better channels. As a result, all AP devices in the second region 310 may get assigned to the same channel to which the "worst" radio in the first region 300 is assigned.

Figure 9:
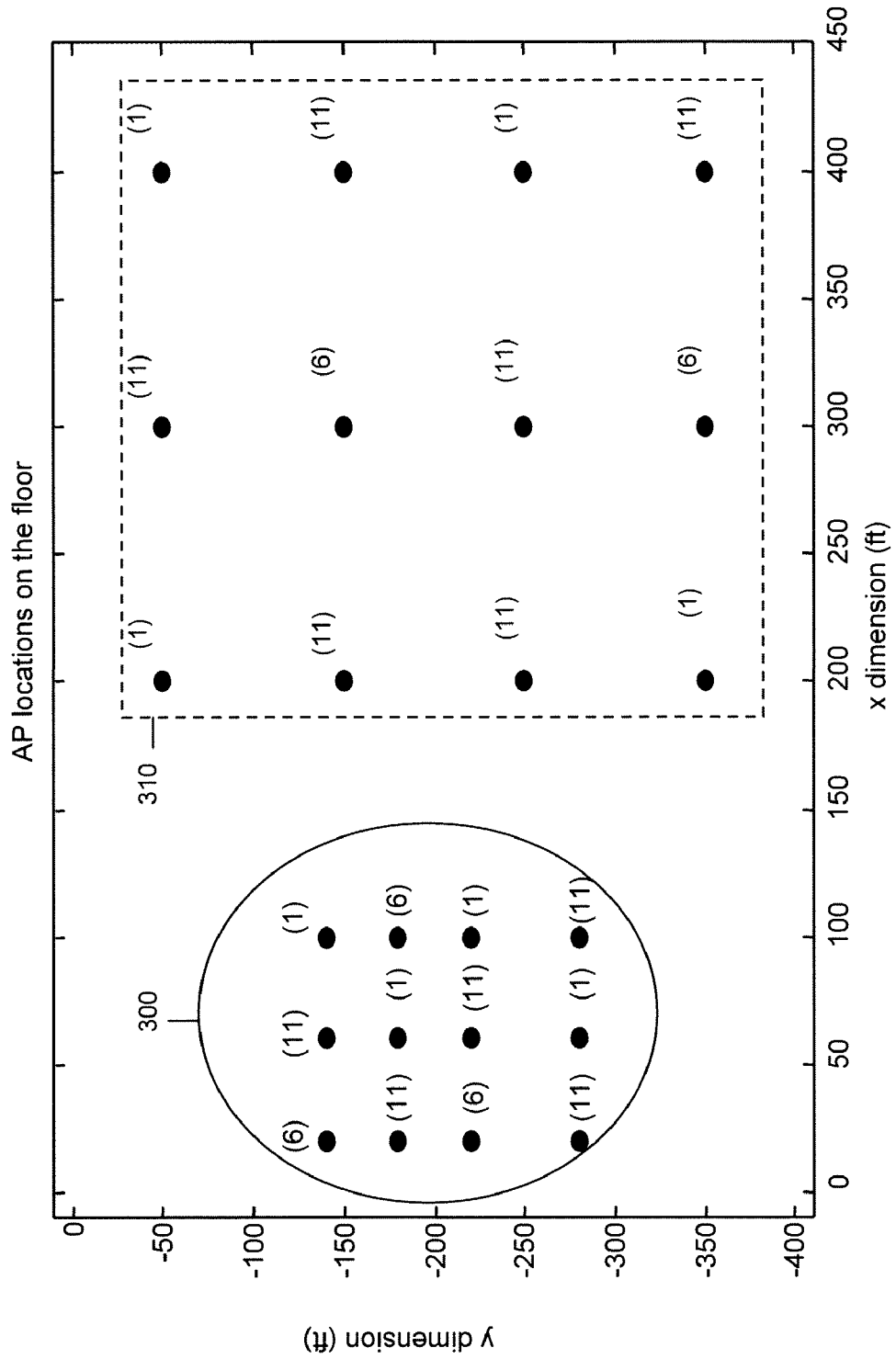
FIG. 9 is a diagram illustrating groups of access points in a wireless network and their channel assignments that result when the techniques shown in FIG. 8 are employed to minimize pinning.

However, using the randomization techniques described herein, pinning prevention is achieved such that may yield a channel assignment as in FIG. 9. This assignment is not perfect, but it is much better than that shown in FIG. 7. Most importantly, the AP devices in the region 310 are not all pinned to the same channel, but have been able to explore different channel plans and have distributed themselves reasonably well across the three orthogonal 2.4 GHz channels (e.g., in this particular case, Channels 1, 6 and 11).

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
at a controller device configured to communicate with a plurality of wireless network access point devices operating on at least one of a plurality of channels in a wireless network, receiving from the access point devices wireless activity data representing activity in each of the channels;
generating at least one metric derived from the wireless activity data corresponding to one or more physical metrics measured by the access point devices representing activity in each of the channels associated with signals of devices operating in the wireless network and associated with signals and energy from devices that are not operating in the wireless network, wherein the at least one metric is a mathematical conversion of the one or more physical metrics;
during a channel plan evaluation session, evaluating the at least one metric for multiple ones of the access point devices to determine whether a channel on which at least one access point device operates should be changed such that a decision to change the channel on which the at least one access point device operates is limited to a localized region of the wireless network and does not affect a channel change decision for access points outside of the localized region of the wireless network; and
changing the channel on which the at least one access point device operates based on said evaluating.

2. The method of claim 1, wherein evaluating comprises:
(i.) generating a list of candidate access point devices whose metric is to be evaluated during the channel plan evaluation session;
(ii.) selecting a selected access point device in the list of candidate access point devices;
(iii.) evaluating a selected metric of the at least one metric corresponding to the selected access point device to determine whether a different channel from a current channel that the selected access point device is operating on would provide better performance based on other metrics of the at least one metric for each channel;
(iv.) identifying neighbor access point devices in the localized region of the wireless network for the selected access point device based on a receive signal strength with respect to signals transmitted by the selected access point device;
(v.) analyzing an impact of a channel change for the selected access point device to the neighbor access point devices in the localized region of the wireless network;
(vi.) removing from the list the selected access point device and one or more neighbor access point devices in the localized region of the wireless network based on said (v.) analyzing; and
repeating (ii.) selecting, (iv.) identifying, (v.) analyzing and (vi.) removing with respect to a next selected access point in the list until the list is empty.

3. The method of claim 2, wherein (iv.) identifying comprises identifying one-hop neighbor access point devices for which the receive signal strength exceeds a threshold and identifying two-hop neighbor access point devices for which the received signal strength from signals from any one of the one-hop neighbor access point devices exceeds a threshold.

4. The method of claim 3, wherein (v.) analyzing comprises evaluating a one-hop metric of the at least one metric for each of the one-hop neighbor access point devices on each of the channels based on a choice for a new channel for the selected access point device;
generating a new metric for the selected access point device for the new channel;
comparing the new metric for the new channel with a current metric for a current channel for the selected access point device;
determining whether a difference between the new metric for the new channel and the current metric for the current channel of the selected access point device satisfies a first criterion.

5. The method of claim 4, when it is determined that the new metric for the new channel and the current metric for the current channel of the selected access point device satisfies the first criterion, further comprising computing a cumulative metric from the new metric for the selected access point device and neighbor metric metrics for the one-hop and two-hop neighbor access point devices.

6. The method of claim 5, and further comprising:
comparing the cumulative metric with a second criterion; and
assigning a new channel plan evaluation session to the selected access point and to the one-hop and two-hop neighbor access point devices depending on whether the difference satisfies the first criterion, depending on whether the cumulative metric satisfies the second criterion and depending on whether channel searching is performed during a first channel searching stage or a second channel searching stage.

7. The method of claim 6, wherein during the first channel searching stage, said assigning the new channel plan evaluation session is based on satisfying the first criterion or the cumulative metric and satisfying the second criterion and during the second channel searching stage, said assigning the new channel plan evaluation session is based on satisfying the first criterion and the cumulative metric and satisfying the second criterion.

8. The method of claim 7, wherein during the first channel searching stage, removing comprises removing only the one-hop neighbor access point devices from the list, and during the second channel searching stage, removing comprises removing the one-hop and two-hop neighbor access point devices from the list.

9. The method of claim 2, wherein (ii.) selecting comprises selecting the selected access point device in the list that has a worst metric among remaining access point devices in the list.

10. The method of claim 2, wherein (ii.) selecting comprises selecting the selected access point device randomly from the list according to at least one of: a uniform distribution and a distribution that assigns a greater probability to those access point devices in the list whose metric indicates a worst performance.

11. The method of claim 2, wherein (ii.) selecting the selected access point device comprises alternating at successive selection iterations between randomly selecting remaining access point devices in the list and selecting one access point device in the list that currently has a worst metric among the remaining access point devices in the list.

12. A system comprising:
a plurality of wireless network access point devices each configured to operate on at least one of a plurality of channels in a wireless network, wherein each access point is configured to receive radio frequency energy in each of the plurality of channels to measure physical metrics of the channels from the radio frequency energy;
a controller apparatus configured to:
receive wireless activity data from each of the wireless access point devices;
generate at least one metric derived from the physical metrics representing activity in each of the channels associated with signals of devices operating in the wireless network and associated with signals and energy from devices that are not operating in the wireless network, wherein the at least one metric is a mathematical conversion of the one or more physical metrics;
communicate with the access point devices and to supply control signals that control which channel each of the wireless network access point devices uses for operating in the wireless network;
evaluate during a channel plan evaluation session the at least one metric for multiple ones of the access point devices to determine whether a channel on which at least one access point device operates should be changed such that a decision to change the channel on which the at least one access point device operates is limited to a localized region of the wireless network and does not affect a channel change decision for access points outside of the localized region of the wireless network; and
change the channel on which the at least one access point device operates based on evaluation of the metric for multiple ones of the plurality of access point devices.

13. The system of claim 12, wherein the controller apparatus is configured to evaluate by:
(i.) generating a list of candidate access point devices whose metric is to be evaluated during the channel plan evaluation session;
(ii.) selecting a selected access point device in the list of candidate access point devices;
(iii.) evaluating a selected metric of the at least one metric corresponding to the selected access point device to determine whether a different channel from a current channel that the selected access point device is operating on would provide better performance based on other metrics of the at least one metric for each channel;
(iv.) identifying neighbor access point devices in the localized region of the wireless network for the selected access point device based on a receive signal strength with respect to signals transmitted by the selected access point device;
(v.) analyzing an impact of a channel change for the selected access point device to the neighbor access point devices in the localized region of the wireless network;
(vi.) removing from the list the selected access point device and one or more neighbor access point devices in the localized region of the wireless network based on said (v.) analyzing; and
repeating (ii.) selecting, (iv.) identifying, (v.) analyzing and (vi.) removing with respect to a next selected access point in the list until the list is empty.

14. The system of claim 13, wherein the controller apparatus is configured to perform said (iv.) identifying by identifying one-hop neighbor access point devices for which the receive signal strength exceeds a threshold and identifying two-hop neighbor access point devices for which the received signal strength from signals from any one of a one-hop neighbor access point device exceeds a threshold.

15. The system of claim 13, wherein the controller apparatus is configured to perform said (ii.) selecting by selecting the selected access point device in the list that has a worst metric among remaining access point devices in the list.

16. The system of claim 13, wherein the controller apparatus is configured to perform said (ii.) selecting the selected access point device randomly from the list according to at least one of: a uniform distribution and a distribution that assigns a greater probability to those access point devices in the list whose metric indicates a worst performance.

17. The system of claim 13, wherein the controller apparatus is configured to perform said (ii.) selecting the selected access point device by alternating at successive selection iterations between randomly selecting remaining access point devices in the list and selecting one access point device in the list that currently has a worst metric among the remaining access point devices in the list.

18. One or more tangible non-transitory computer readable storage media storing instructions for execution by a processor and when executed operable to:

receive from each of a plurality of wireless access point devices operating on at least one of a plurality of channels in a wireless network, wireless activity data representing activity in each of the channels;

generate at least one metric derived from the wireless activity data corresponding to one or more physical metrics measured by the access point devices representing activity in each of the channels associated with signals of devices operating in the wireless network and associated with signals and energy from devices that are not operating in the wireless network, wherein the at least one metric is a mathematical conversion of the one or more physical metrics;

during a channel plan evaluation session, evaluate the wireless activity data for multiple ones of the access point devices to determine whether a channel on which at least one access point device operates should be changed such that a decision to change the channel on which the at least one access point device operates is limited to a localized region of the wireless network and does not affect a channel change decision for access points outside of the localized region of the wireless network; and change the channel on which the at least one access point device operates based on the evaluation.

19. The non-transitory computer readable storage media of claim 18, wherein the instructions that are operable to evaluate comprises instructions that are operable to:

(i.) generate a list of candidate access point devices whose wireless activity data is to be evaluated during the channel plan evaluation session;

(ii.) select a selected access point device in the list of candidate access point devices;

(iii.) evaluate a selected metric of the at least one metric, wherein the selected metric is a mathematical conversation of a physical metric corresponding to the selected access point device to determine whether a different channel from a current channel that the selected access point device is operating on would provide better performance based on other metrics of the at least one metric for each channel;

(iv.) identify neighbor access point devices in the localized region of the wireless network for the selected access point device based on a receive signal strength with respect to signals transmitted by the selected access point device;

(v.) analyze an impact of a channel change for the selected access point device to the neighbor access point devices in the localized region of the wireless network;

(vi.) remove from the list the selected access point device and one or more neighbor access point devices in the localized region of the wireless network based on said (v.) analyze operation; and (vii.) repeat said (ii.) select, (iv.) identify, (v.) analyze and (vi.) remove operations with respect to a next selected access point in the list until the list is empty.

20. The non-transitory computer readable storage media of claim 19, wherein the instructions that are operable to (ii.) select comprise instructions that are operable to select the selected access point device randomly from the list according to at least one of: a uniform distribution and a distribution that assigns a greater probability to those access point devices in the list whose metric indicates a worst performance.

21. The non-transitory computer readable storage media of claim 19, wherein the instructions that are operable to (ii.) select the selected access point device comprise instructions that are operable to alternate at successive selection iterations between randomly selecting remaining access point devices in the list and selecting one access point device in the list that currently has a worst metric among the remaining access point devices in the list.

\* \* \* \* \*